(12) United States Patent
Graf et al.

(10) Patent No.: US 6,648,566 B1
(45) Date of Patent: Nov. 18, 2003

(54) PORTABLE DEVICE

(76) Inventors: Gebhard Graf, Chatillon 121, Preles (CH), 2515; Ottilia Graf, Chatillon 121, Preles (CH), 2515

( * ) Notice: Subject to any disclaimer, the term of this patent is extended or adjusted under 35 U.S.C. 154(b) by 0 days.

(21) Appl. No.: 09/868,249

(22) PCT Filed: Dec. 14, 1999

(86) PCT No.: PCT/CH99/00601

§ 371 (c)(1),
(2), (4) Date: Sep. 28, 2001

(87) PCT Pub. No.: WO00/35643

PCT Pub. Date: Jun. 22, 2000

(51) Int. Cl.[7] ............................. B23C 1/20; B23B 45/00
(52) U.S. Cl. .................... 409/182; 144/136.95; 408/14; 408/53; 408/110; 409/218
(58) Field of Search .......................... 408/53, 97, 110, 408/111, 112, 67, 79, 14; 409/175, 180, 181, 182, 218, 137; 144/136.95

(56) References Cited

U.S. PATENT DOCUMENTS

| | | | | |
|---|---|---|---|---|
| 2,527,968 A | * | 10/1950 | Sherman et al. | 408/14 |
| 3,389,729 A | * | 6/1968 | Macala | 408/53 |
| 4,209,069 A | * | 6/1980 | Smith | 173/75 |
| 4,917,549 A | * | 4/1990 | Geernaert | 408/42 |
| 4,971,122 A | * | 11/1990 | Sato et al. | 144/136.95 |
| 5,217,331 A | * | 6/1993 | Ericksen | 408/42 |
| 5,381,595 A | * | 1/1995 | Keith et al. | 29/467 |
| 5,419,662 A | * | 5/1995 | Ericksen | 408/42 |
| 5,586,846 A | * | 12/1996 | Johns | 408/112 |
| 5,609,444 A | * | 3/1997 | Valsecchi | 408/79 |
| 5,881,784 A | * | 3/1999 | Morikawa et al. | 144/136.95 |

FOREIGN PATENT DOCUMENTS

| | | |
|---|---|---|
| EP | 420498 A3 | 4/1991 |
| EP | 420498 A2 | 4/1991 |
| JP | 60094249 | 5/1985 |
| JP | 06254736 | 9/1994 |

* cited by examiner

Primary Examiner—Daniel W. Howell
(74) Attorney, Agent, or Firm—Crowell & Moring LLP

(57) ABSTRACT

A portable device includes at least one tool driven by a motor and provided in a housing with at least two housing surfaces at relative right angles to each other. One of the housing surfaces is arranged at a right angle relative to the tool and the device includes a plurality of stops fixedly connect and pivotably connected with the housing to be moved out or pivoted out until corresponding stop surfaces are reached. The stop surfaces have different differences with respect to the tool.

12 Claims, 5 Drawing Sheets

PORTABLE DEVICE

BACKGROUND AND SUMMARY OF THE INVENTION

This application claims priority of Switzerland application 2490/98, filed Dec. 15, 1998, the disclosure of which is expressly incorporated by reference herein.

The invention relates to a portable device consisting of a tool which can be drive by a motor, of a housing having two housing surfaces disposed at a right angle to one another, of these, one housing surface being arranged at, a right angle to the tool, and having one or several stops.

Portable devices of this type are sold on the market and are therefore known. From European Patent Document EP 0666154 A1, a portable, drill is known and from Swiss Patent Document CH 622981, a portable groove milling cutter is known which have the advantage that these portable machines can be stopped on the stops in a precise manner when drilling and groove milling.

Portable devices of the initially mentioned type have the disadvantage that the stops, such as angle plates, pins and distance plates, are loose parts and that the pivotable stop can be used only for one plate thickness or only for one edge spacing with respect to the gang bores. These loose parts must be mounted and adjusted for the machining of the various plate thicknesses or various edge spacings with respect to the gang bores. This mounting and adjustment is time consuming and represents a source of faults. Often, loose parts must be found before the mounting and furthermore these loose parts are easily lost.

It is an object of the invention to provide a portable device which can be operated in a simple and economical manner for the machining of the various plate thicknesses and various edge spacings with respect to the gang bores.

The portable device according to the invention providing that time-consuming mounting and adjustment of loose parts will no longer be necessary for the machining of the plate thicknesses or various edge spacings with respect to the gang bores which occur most frequently. Furthermore, the source of faults for the correct adjustment is considerably reduced, searching for the loose parts is no longer required and misplacing of the loose parts is no longer possible. As a result, the portable device can be operated in a much simpler and more economical manner.

According to an advantageous embodiment of the invention, the stop can be lowered into the housing because the stop is a pivotable part or because a stop body, which can be moved out, is not centrally disposed and has several stop surfaces.

As a further advantageous development of the invention, it is provided that, as a result of the positioning device, the required stop surface of the stop body with several stop surfaces is held on the pin in a manner directed against the workpiece.

As a result of the independent moving-out of the stop pin from the stop body with several stop surfaces, the stop pin also serves as a centering device for producing a series bore.

Another advantage results from the pivoted-out stop having the three centering pins so that bores can be made perpendicular to the plate plane for assembly fittings.

Furthermore, because of the construction of the housing surfaces as stop surfaces, the portable device can be used in a handy manner. Good accessibility is ensured in the corners and in furniture pieces.

As a result of the shavings suction device on the housing, the shavings and the dust can be sucked out of the housing. As a result, the functioning of the stops is ensured because the stop surface are free of shavings and dust.

In a preferred embodiment of the invention the portable device can be used as a hand drilling machine as a result of the drill tool(s).

In another preferred embodiment of the invention the portable device can be used as a portable groove milling machine as a result of the milling disk tool.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
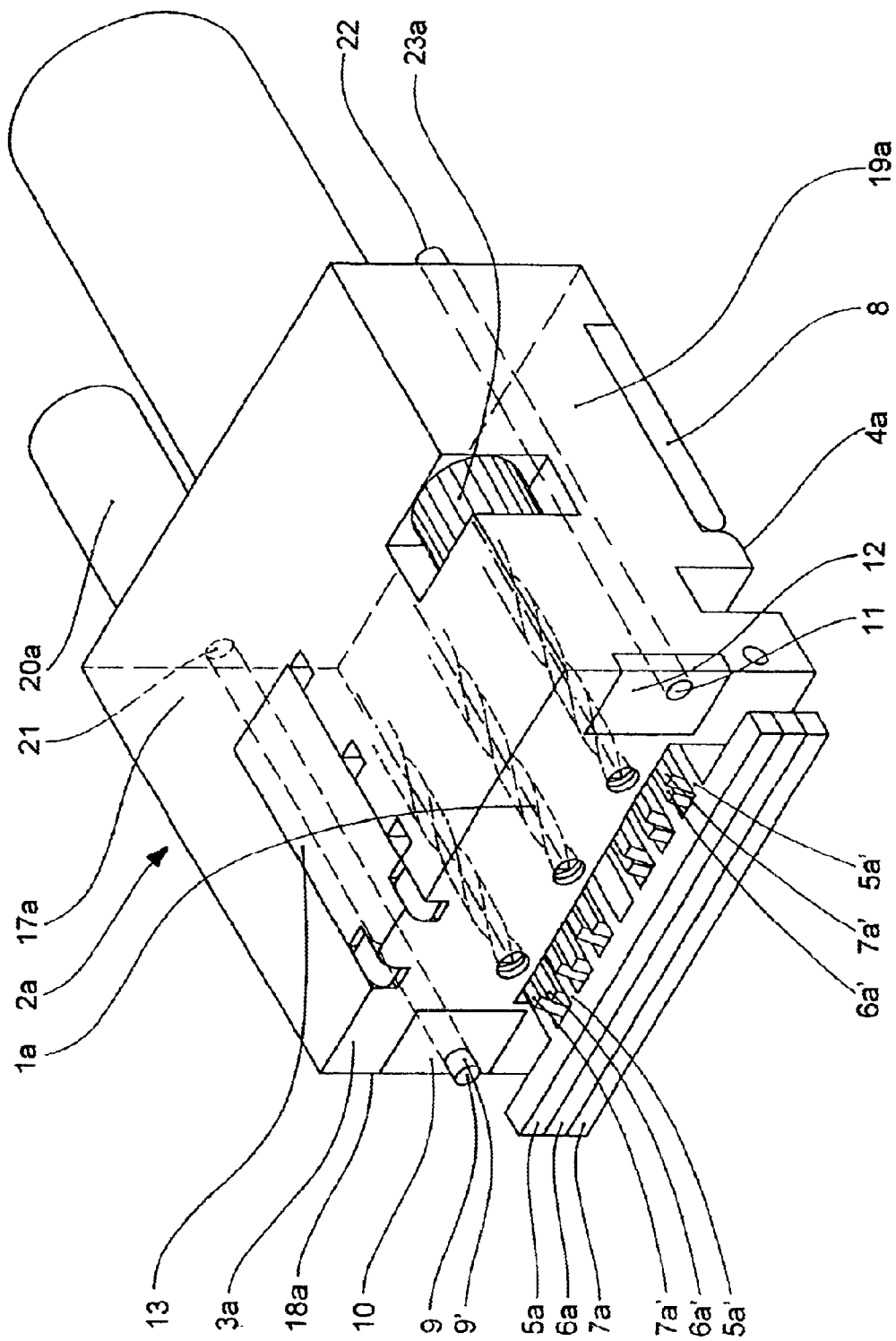
FIGS. 1, 2 and 3 are perspective views of a portable drilling machine according to the invention with partially pivoted-out or moved-out stops or both.

The portable drilling machine illustrated in FIG. 1 includes one or more drills 1a operated by a motor, is a housing 2a which has two housing surfaces 3a, 4a disposed at a right angle relative to one another, of which, the housing surface 3a is disposed at a right angle relative to the drill or drills 1a. The stops 5a, 6a, 7a, 8, 9, 10, 11, 12, 13 are fixedly connected with the housing 2a and can be pivoted out or moved out or both until they reach one of the stop surfaces 5a; 6a; 7a; 3a; 17a; 18a; 19a or 13'. The stop 7a, as a pivotable part, is pivoted out of the housing 2a. By means of the stop surface 7a' a plate thickness of 14 mm can be machined. The stop pin 9 is moved out independently of the stop body 10 with several stop surfaces. The stop pin 9 can be moved out by pressing a projecting pin 21. The stop pin 9 is used as a centering device for producing a series bore. By means of the stop surface 9', an edge spacing with respect to gang bores of 28 mm can be implemented. The stops 8, 10, 11, 12, 13 are lowered in the housing 2a. The housing surfaces 3a, 4a, 17a, 18a, 19a are constructed as stop surfaces. No parts project beyond the housing surfaces 3a, 4a, 17a, 18a, 19a. The drilling depth limit 22 with a mm scale is also within these stop surfaces. As a result, the portable device can be used in a handy manner. A good accessibility in the corners and in pieces of furniture is ensured. As a result of the shavings suction device 20a on the housing 2a, the shavings and the dust can be sucked out of the housing 2a. As a result, the functioning of the stops 7a, 9 is ensured because the stop surfaces 7a', 9' are free of shavings and dust.

Figure 2:
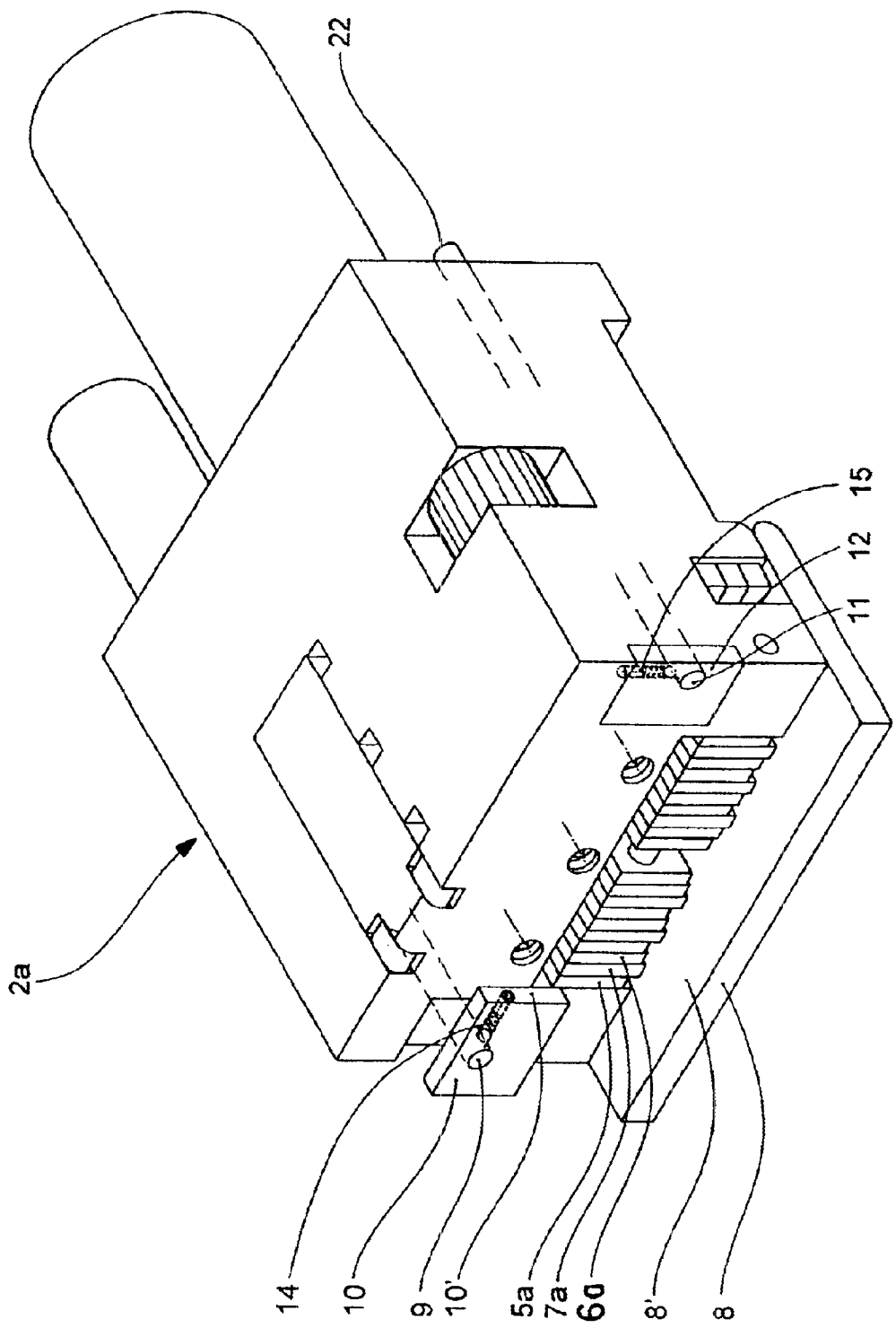

The portable drilling machine illustrated in FIG. 2 also shows the stop 8, as a pivotable stop, being swivelled out of the housing 2a. By means of the stop surface 8', an edge spacing with respect to the gang bores of 37 mm can be carried out. The stop body 10 with several stop surfaces which is not centrally disposed can be moved out by pressing the also projecting pin 21. By means of the stop surface 10', an edge spacing with respect to the gang bores of 12 mm can be implemented. The positioning device 14 holds the required stop surface 10' of the stop body 10 with several stop surfaces on the pin 9 and targeted against the drill 1a. The positioning device 14 may, for example, be a threaded pin with an integrated elastic ball.

Figure 3:
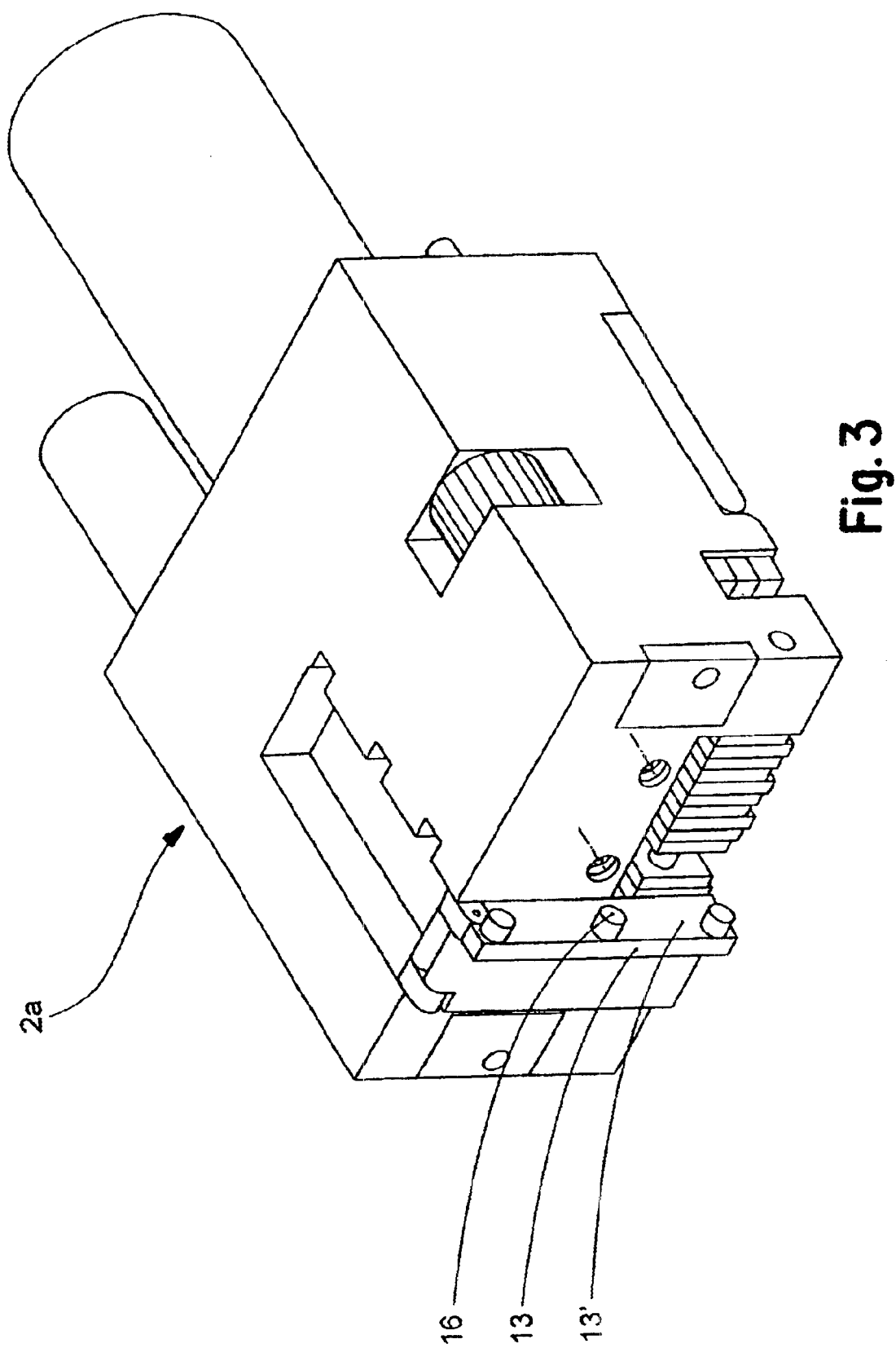
Figure 4:
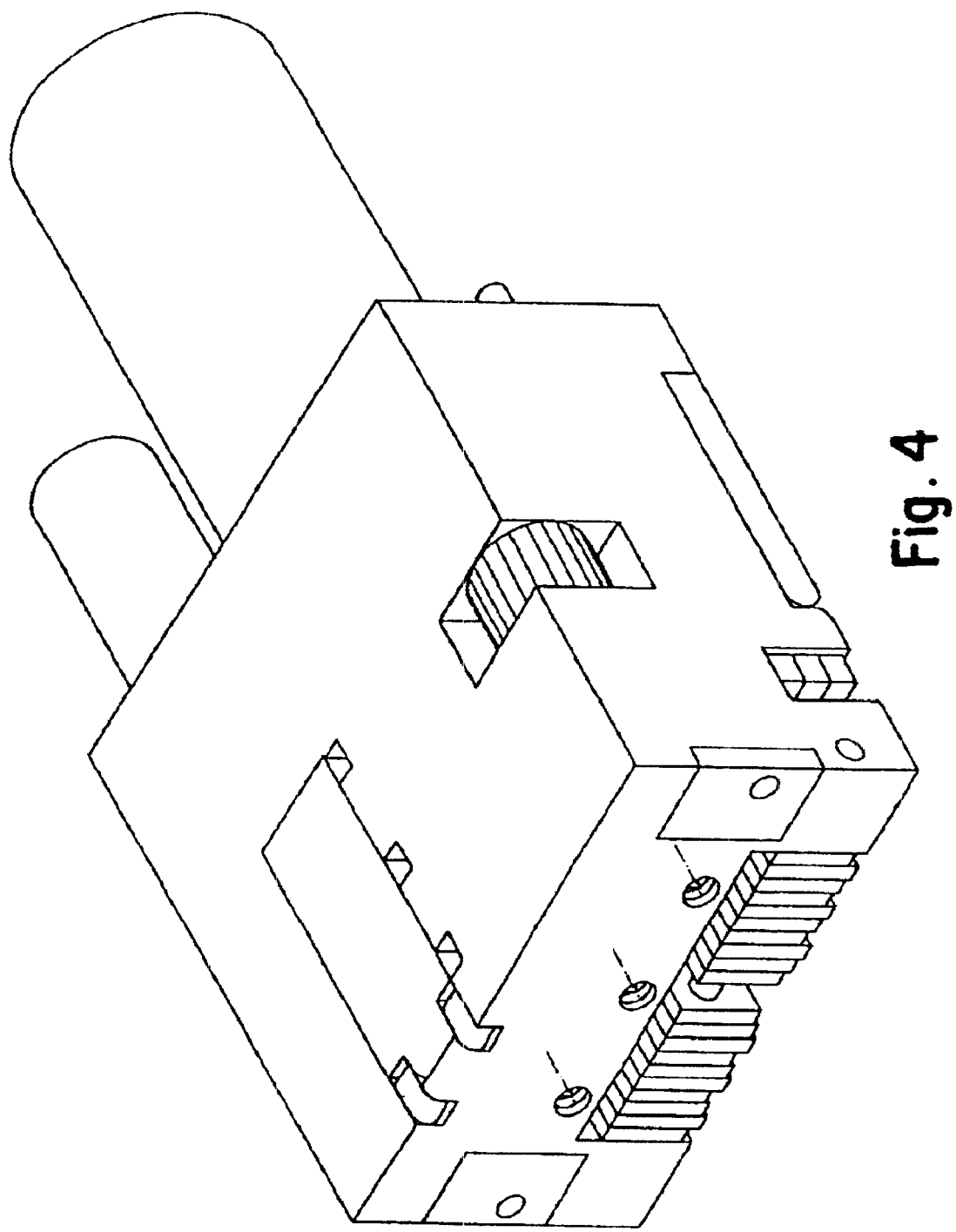
FIG. 4 is a perspective view of a portable drilling machine according to the invention with stops which are not pivoted out and not moved out.

The portable drilling machine illustrated in FIG. 3 also shows the stop 13 as a pivotable part pivoted out of the housing 2a. By means of the stop surface 13' with the three centering pins 16, bores can be implemented perpendicular to the plate plane for assembly fittings.

Figure 5:
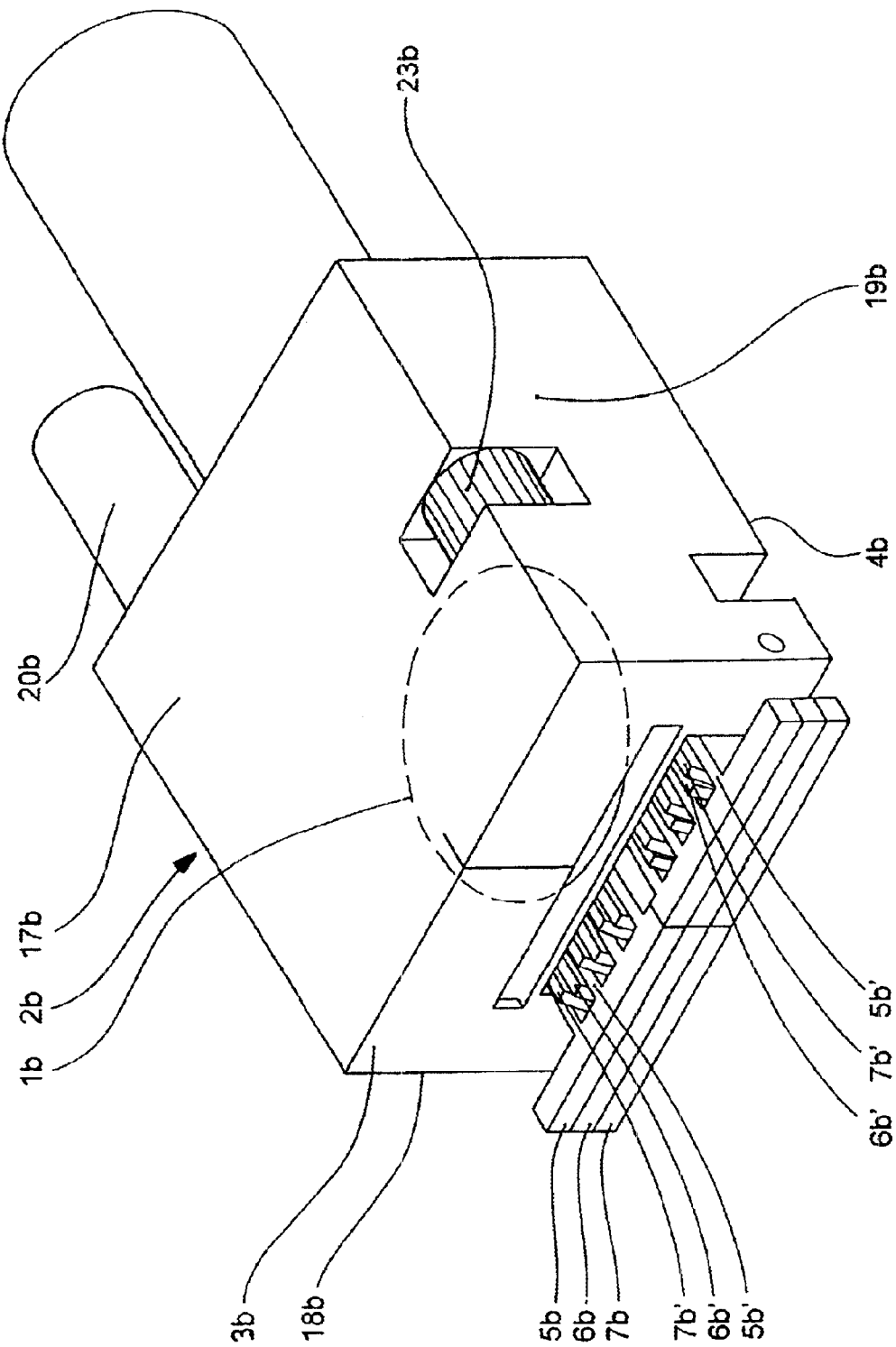
FIG. 5 is a perspective view of a portable groove milling machine according to the invention with a pivoted-out stop.

The portable groove milling machine illustrated in FIG. 5 consists of a milling disk 1b which can be driven by a motor, of a housing 2b which has two housing surfaces 3b, 4b disposed at a right angle relative to one another, one housing surface 3b being arranged at a right angle relative to the milling disk 1b. The stops 5b, 6b, 7b are fixedly connected with the housing 2b and can be pivoted out or moved out or both. The stop 7b, as a pivotable part, is pivoted out of the housing 2b. By means of the stop surface 7b', a plate thickness of 14 mm can be machined in a centered manner, or the stop surface 7b' can be adjusted to a freely selectable angle relative to the millingdisk 1b. The housing surfaces 3b, 4b, 17b, 18b, 19b are constructed as stop surfaces. No parts project beyond the housing surfaces 3b, 4b, 17b, 18b, 19b. The groove milling depth limit 22b is also within these stop surfaces. As a result, the portable device can be used in a handy manner. A good accessibility in the corners and in pieces of furniture is ensured. As a result of the shavings suction device 20b on the housing 2a, the shavings and the dust can be sucked out of the housing 2a. As a result, the functioning of the stop 7b is ensured because the stop surface 7b' is free of shavings and dust.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A portable device include a housing containing at least one tool capable of being motor driven, wherein said housing has at least two housing surfaces disposed at a right angle relative to each other, wherein a first one of said two housing surfaces is arranged at a right angle relative to each of said at least one tool, and wherein said device has at least two stops fixedly connected with the housing, wherein each of said two stops are pivotally mounted to at least one of move away and pivot away from said housing;

at least two stop surfaces corresponding to said at least two stops, wherein each of said at least two stops surfaces have different distances from said at least one tool; and wherein at least one of said stops has a plurality of stop surfaces connected by a positioning device with a stop pin.

2. The device according to claim 1, wherein each of said at least two stops is constructed as at least one of a pivotable part and as a stop body with several stop surfaces capable of being moved out and wherein said at least two stops are not centrally disposed in a first of the housing surfaces.

3. The device according to claim 1 wherein said stop pin is moveable independently with the at least one stop having several stop surfaces.

4. A portable device include a housing containing at least one tool capable of being motor driven, wherein said housing has at least two housing surfaces disposed at a right angle relative to each other, wherein a first one of said two housing surfaces is arranged at a right angle relative to each of said at least one tool, and wherein said device has at least two stops fixedly connected with the housing, wherein each of said two stops are pivotally mounted to at least one of move away from and pivot away from said housing;

at least two stop surfaces corresponding to said at least two stops, wherein each of said at least two stops surfaces have different distances from said at least one tool; and wherein one of said stops includes at least one centering pin.

5. The device according to claim 1 wherein said housing surfaces are stop surfaces.

6. The device according to claim 1 further including a shavings suction device provided on said housing.

7. The device according to claim 1 wherein said tool is a hand drilling machine.

8. A portable device with a hand groove milling machine including a milling disk in a housing having at least two housing surfaces disposed at a right angle relative to each other wherein a first one of said two housing surfaces is arranged at a right angle relative to each of said at least one milling disk and wherein said device has at least two stops fixedly connected with the housing wherein each of said two stops are pivotally mounted to at least one of move away from and pivot away from said housing; and at least two stop surfaces corresponding to said at least two stops wherein each of said at least two stops surfaces have different distances from said at least one milling disk.

9. The device according to claim 4, wherein said housing surfaces are stop surfaces.

10. The device according to claim 4, further including a shavings suction device provided on said housing.

11. The device according to claim 4, wherein said tool is a hand drilling machine.

12. The device according to claim 4, wherein each of said at least two stops is constructed as at least one of a pivotable part and as a stop body with several stop surfaces capable of being moved out and wherein said at least two stops are not centrally disposed in a first of the housing surfaces.

* * * * *